(12) United States Patent
Shigeta et al.

(10) Patent No.: US 8,219,690 B2
(45) Date of Patent: Jul. 10, 2012

(54) RECORDING MEDIUM THAT STORES INTERNET-PROTOCOL (IP) ADDRESS ASSIGNMENT CONTROL PROGRAM, IP ADDRESS ASSIGNMENT CONTROL APPARATUS, AND IP ADDRESS ASSIGNMENT CONTROL METHOD

(75) Inventors: Soichi Shigeta, Kawasaki (JP); Yuji Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 149 days.

(21) Appl. No.: 12/750,664

(22) Filed: Mar. 30, 2010

(65) Prior Publication Data

US 2010/0250715 A1 Sep. 30, 2010

(30) Foreign Application Priority Data

Mar. 31, 2009 (JP) .................................. 2009-88384

(51) Int. Cl.
*G06F 15/16* (2006.01)
(52) U.S. Cl. .......................................... 709/227
(58) Field of Classification Search .................... 709/227
See application file for complete search history.

(56) References Cited

U.S. PATENT DOCUMENTS

| 7,433,356 | B2* | 10/2008 | Jain et al. ....................... 370/392 |
| 7,724,747 | B2* | 5/2010 | Jain et al. ....................... 370/392 |
| 7,848,327 | B2* | 12/2010 | Jain et al. ....................... 370/392 |
| 7,886,050 | B2* | 2/2011 | Raja et al. ...................... 709/224 |
| 2004/0111494 | A1* | 6/2004 | Kostic et al. ................... 709/220 |
| 2005/0114507 | A1* | 5/2005 | Tarui et al. ..................... 709/224 |
| 2006/0218273 | A1* | 9/2006 | Melvin .......................... 709/224 |
| 2006/0248229 | A1* | 11/2006 | Saunderson et al. ........... 709/245 |
| 2008/0281973 | A1* | 11/2008 | Yang ............................. 709/228 |
| 2009/0125957 | A1* | 5/2009 | Singh et al. .................... 725/111 |
| 2010/0121946 | A1* | 5/2010 | Claes et al. .................... 709/223 |

FOREIGN PATENT DOCUMENTS

JP 2007-183837 7/2007

* cited by examiner

*Primary Examiner* — Wing Chan
*Assistant Examiner* — Alicia Baturay
(74) *Attorney, Agent, or Firm* — Fujitsu Patent Center

(57) ABSTRACT

An internet-protocol address assignment control apparatus obtains, via an interface provided in a first communication device, a first unique number for a first interface provided in a server apparatus connected to the interface provided in the first communication device and a second unique number for a second interface provided in the server apparatus connected to an interface provided in a second communication device. The apparatus stores, in a storage, the obtained second unique number for the second interface provided in the server apparatus on a basis of the first unique number for the first interface provided in the server apparatus.

10 Claims, 15 Drawing Sheets

FIG.9

| PORT NUMBER | NETWORK SWITCH 1 | | NETWORK SWITCH 2 | | NETWORK SWITCH … | |
|---|---|---|---|---|---|---|
| | IP ADDRESS | MAC ADDRESS | IP ADDRESS | MAC ADDRESS | IP ADDRESS | MAC ADDRESS |
| 1 | 192.168.1.11 | | 172.16.64.1 | | … | … |
| 2 | 192.168.1.12 | 00:0A:EF:12:56:7D | 172.16.64.2 | | … | … |
| ⋮ | ⋮ | ⋮ | ⋮ | ⋮ | ⋮ | ⋮ |
| n | 192.168.1.20 | | 172.16.64.10 | | … | … |

111

RECORDING MEDIUM THAT STORES INTERNET-PROTOCOL (IP) ADDRESS ASSIGNMENT CONTROL PROGRAM, IP ADDRESS ASSIGNMENT CONTROL APPARATUS, AND IP ADDRESS ASSIGNMENT CONTROL METHOD

CROSS-REFERENCE TO RELATED APPLICATIONS

This application is based upon and claims the benefit of priority of the prior Japanese Patent Application No. 2009-088384, filed on Mar. 31, 2009, the entire contents of which are incorporated herein by reference.

FIELD

The embodiments discussed herein relate to IP address assignment control.

BACKGROUND

In recent years, thousands to tens of thousands of servers are operated and managed at a large-scale data center. For installation of a large number of servers, user desires exist for efficiently assigning IP (internet protocol) addresses to the servers. In order to easily find failed nodes, there are also desires for capabilities of locating the server installation positions on the basis of the IP addresses.

The servers communicate with other servers via a network switch provided in a rack or the like. That is, the network switch serves as a network consolidation point. Thus, nowadays, in order to satisfy the desires described above, various technologies for managing the servers by using the network switch as a reference point are available.

An example of technologies for managing servers using a network switch as a reference point will now be described with reference to FIG. 12 through FIG. 15. A description below is given of a technology including an IP address assignment control apparatus that performs processing for assigning IP addresses to interfaces provided in calculation servers.

FIG. 12 is a diagram illustrating an example of a system configuration including an IP address assignment control apparatus of related art.

In the system configuration of the related art, for example, as illustrated in FIG. 12, an IP address assignment control apparatus, a DHCP (dynamic host configuration protocol) server, and a network switch are connected with each other. The network switch is connected to at least one calculation server and serves as a calculation-server consolidation point. The network switch has ports #1 to #n, each having a port connected to a corresponding interface provided in each calculation server. The calculation server communicates with another calculation server, an external apparatus, and so on via the port.

FIG. 13 is a diagram illustrating an example of the configuration at a data center in the system including the IP address assignment control apparatus of the related art.

In the configuration at the data center in the system of the related art, for example, the network switch and the at least one calculation server, which are illustrated in FIG. 12, are consolidated in a rack, as illustrated in FIG. 13, and the network switch, the IP address assignment control apparatus, and the DHCP server are connected with each other. At the data center, a plurality of such racks is provided.

FIG. 14 is a diagram illustrating an example of the structure of data held by the apparatuses of the related art.

For example, as illustrated in FIG. 14, the IP address assignment control apparatus of the related art has a data structure in which port numbers for identifying the ports #1 to #n provided in the connected network switch and IP addresses for the interfaces of the calculation servers connected to the ports #1 to #n are associated with each other. As an example of the port numbers and the IP addresses, the IP address assignment control apparatus holds data in which a port number "1" and an IP address "192.168.1.11" are associated with each other.

For example, as illustrated in FIG. 14, the DHCP server of the related art is connected to the calculation servers via the corresponding ports #1 to #n of the network switch. The DHCP server has a data structure in which IP addresses and MAC (media access control) addresses for the interfaces of the calculation servers are associated with each other. As an example of the MAC addresses and the IP addresses, the DHCP server holds data in which a MAC address "00:0A:EF:12:34:B4" and an IP address "192.168.1.11" are associated with each other.

FIG. 15 is a diagram illustrating an example of IP address assignment control processing of the related art.

As illustrated in FIG. 15, for example, the IP address assignment control apparatus has a data structure in which port numbers and IP addresses are associated with each other, and is connected with the network switch and the DHCP server. Data held by the IP address assignment control apparatus includes, for example, a port number "2" and an IP address "192.168.1.12".

As illustrated in FIG. 15, for example, the DHCP server has a data structure in which MAC addresses and IP addresses are associated with each other, and is connected with the IP address assignment control apparatus and the network switch. A description below is given based on the assumption that the setting is at initial setting and thus the data structure of the DHCP server has no data.

As illustrated in FIG. 15, the calculation servers are connected to the network switch via the corresponding interfaces provided in the calculation servers and the corresponding ports #1 to #n provided in the network switch. A description below will be given of a case in which the calculation server connected to the port #2 of the network switch operates.

In the above-described configuration, as indicated by (1) in FIG. 15, the calculation server sends a DHCP request packet, for example, upon startup of the calculation server. The DHCP request packet contains a MAC address "00:0A:EF:12:56:7D" for the interface of the calculation server.

As indicated by (2) in FIG. 15, the network switch reports, to the IP address assignment control apparatus, the port number "2" of the port #2 and the MAC address "00:0A:EF:12:56:7D" contained in the DHCP request packet received via the port #2.

Subsequently, as indicated by (3) in FIG. 15, the IP address assignment control apparatus obtains an IP address "192.168.1.12" associated with the port number "2". Thereafter, as indicated by (4) in FIG. 15, the IP address assignment control apparatus reports the obtained IP address "192.168.1.12" and the reported MAC address "00:0A:EF:12:56:7D" to the DHCP server and instructs the DHCP server so as to register the IP address and the MAC address.

Thereafter, as indicated by (5) in FIG. 15, the DHCP server stores, in the data structure, the MAC address "00:0A:EF:12:56:7D" and IP address "192.168.1.12" reported from the IP address assignment control apparatus. Subsequently, as indicated by (6) in FIG. 15, the DHCP server sends the corresponding IP address "192.168.1.12" to the calculation server via the port #2 as a DHCP response packet for the DHCP request packet containing the MAC address "00:0A:EF:12:56:7D".

Not only does the calculation server corresponding to the port #2 perform the processing described above, but also other calculation servers perform processing as described above. Using the received IP address, each calculation server may communicate with another calculation server, an external apparatus, and so on to be connected.

SUMMARY

According to an embodiment, there is provided an internet-protocol (IP) address assignment control apparatus networked with a first communication device, a second communication device, and a management server networked with the first and second communication devices, each communication device being connected to a server apparatus that sends an information request packet to the management server and that has first and second interfaces, the internet-protocol address assignment control apparatus comprising. The apparatus has a storage in which an interface identification number for identifying an interface provided in the first communication device, a first IP address for the first interface provided in the server apparatus connected to the interface provided in the first communication device, and a first unique number for the first interface provided in the server apparatus. The interface identification number, the first IP address, and the first unique number are associated with each other and are stored in conjunction with a second IP address for the second interface provided in the server apparatus connected to an interface provided in the second communication device. The apparatus has an obtaining section that obtains, via the interface provided in the first communication device, the first unique number for the first interface provided in the server apparatus and a second unique number for the second interface provided in the server apparatus connected to the interface provided in the second communication device. The apparatus has a storing section that stores, in the storage, the obtained second unique number for the second interface provided in the server apparatus, on a basis of the first unique number for the first interface provided in the server apparatus.

It is to be understood that both the foregoing summary description and the following detailed description are exemplary and explanatory and are not restrictive of the invention, as claimed.

BRIEF DESCRIPTION OF DRAWINGS

FIG. 9 illustrates an example of data stored in an IP address assignment table;

DESCRIPTION OF EMBODIMENTS

The related art described above has a problem in that optimization of setting involved in the IP address assignment is not sufficient. Specifically, the related art described above is directed to a system designed for a one-channel network environment in which multiple calculation servers are connected to a single network switch. In practice, however, many network centers are increasingly employing duplication of networks and implementation of a network having two channels, one for business operation and another for management operation.

In the related art described above, even in a multi-channel network environment in which multiple calculation servers are connected to multiple network switches, IP addresses for the interfaces of the calculation servers are set individually. As a result, in the related art described above, optimization of setting involved in the IP address assignment is not sufficient.

Accordingly, the technology disclosed herein is conceived in view of the foregoing situation and to provide at least a technology for IP address assignment control that may enhance the efficiency of setting involved in IP address assignment.

For example, one embodiment of the IP address control program, IP address assignment control apparatus, and IP address assignment control method disclosed herein may enhance the efficiency of setting involved in IP address assignment.

Figure 1:
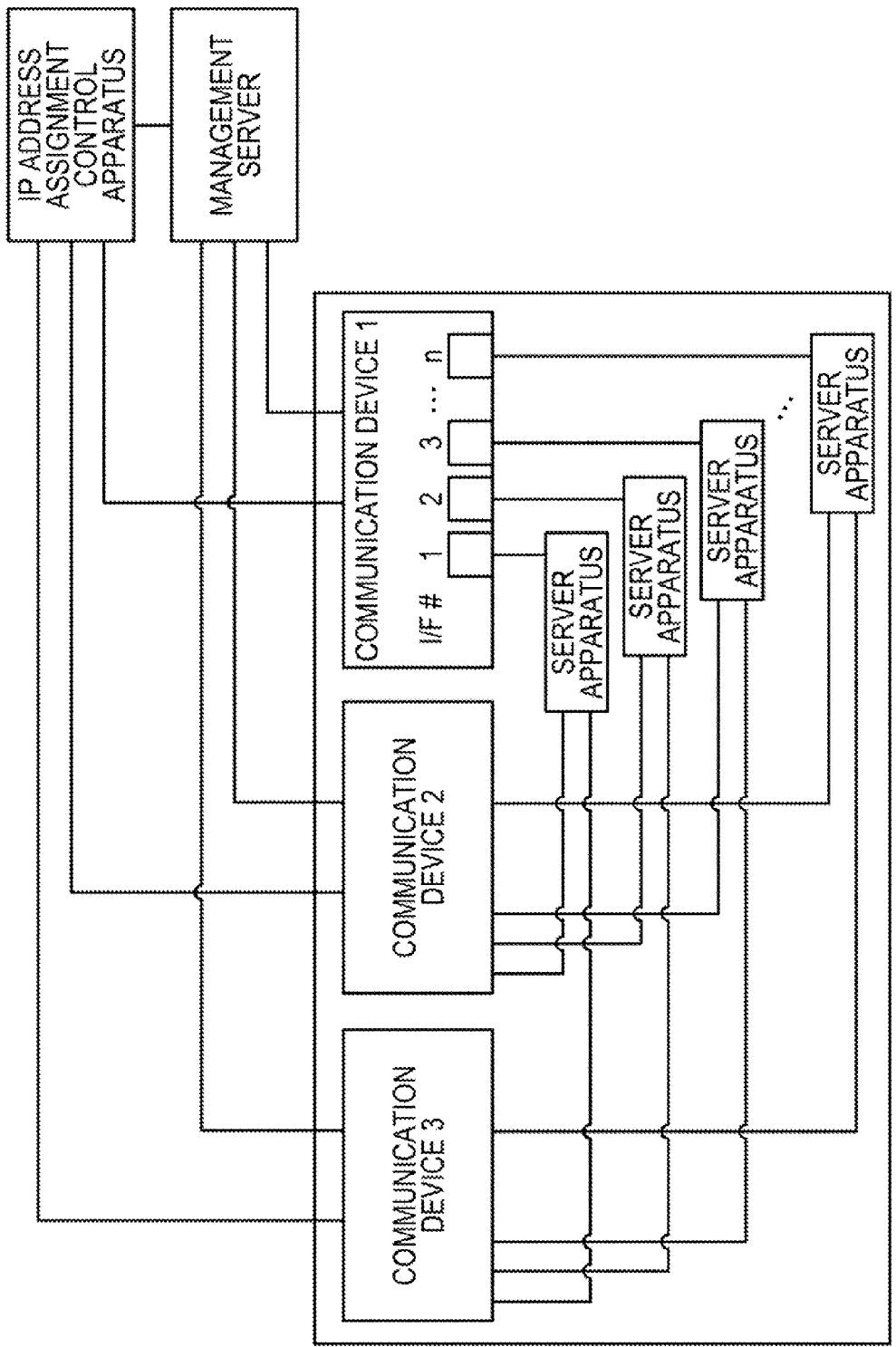
FIG. 1 is a diagram illustrating an example of a system configuration including an IP address assignment control apparatus according to a first embodiment.

FIG. 1 is a diagram illustrating an example of a system configuration including an IP address assignment control apparatus according to a first embodiment.

In the system configuration including an IP address assignment control apparatus disclosed herein, for example, as illustrated in FIG. 1, an IP address assignment control apparatus, a management server, and at least one communication device are connected with each other. Each communication device, e.g., a network switch, is connected to at least one server apparatus and serves as a server-apparatus consolidation point.

Each communication device has interfaces, each being connected to at least one interface provided in each server apparatus. Each server apparatus communicates with another server apparatus, an external apparatus, or the like via the interface provided in the communication device. In FIG. 1, a communication device 1 has n interfaces (I/F) #1 to #n (n is a natural number).

Although a case in which three communication devices 1 to 3 are provided is illustrated in FIG. 1, more communication devices may be provided and the number of which varies depending on the network environment. A description below is given of a case in which a predetermined communication device that serves as a predetermined reference point is the communication device 1.

The IP address assignment control apparatus has a data structure in which interface identification numbers for identifying the interfaces provided in the reference-point communication device 1, IP addresses for the interfaces provided in the server apparatuses connected to the interfaces of the communication device 1, and unique numbers are associated with each other. In the data structure, IP addresses for the interfaces provided in the server apparatuses and the interfaces provided in the communication devices 2 and 3 and so on and unique numbers are further associated with each other. The data structure of the IP address assignment control apparatus is hereinafter referred to as an "IP address assignment table".

The management server has a data structure in which unique numbers and IP addresses for the interfaces of the server apparatuses are associated with each other. A description below is given based on the assumption that the setting is initial setting and thus the data structure of the management server has no data. The data structure of the management server is hereinafter referred to as a "data management table". Each server apparatus is connected with each of the communication devices via at least one interface of the server apparatus and a corresponding one of the interfaces of the communication device. A description below will be given of a case in which the server apparatus connected to the interface #2 of the reference-point communication device 1 operates.

In the above-described configuration, the server apparatus sends an information request packet containing a unique number associated with the interface of the server apparatus. The communication device 1 then receives the information request packet sent from the server apparatus. Subsequently, the communication device 1 reports, to the IP address assignment control apparatus, the unique number contained in the received information request packet and the interface identification number for identifying the interface of the communication device 1.

Thereafter, the IP address assignment control apparatus stores, in the IP address assignment table, the unique number associated with the interface identification number reported from the communication device 1. The IP address assignment control apparatus then obtains the stored unique number and the IP address associated with the unique number. Subsequently, the IP address assignment control apparatus reports the obtained IP address and unique number to the management server and instructs the management server so as to register the IP address and the unique number in the data management table held in the management server.

The management server then stores, in the data management table, the unique number and IP address reported from the IP address assignment control apparatus. Subsequently, the management server sends the corresponding IP address to the server apparatus via the communication device 1 as an information response packet for the information request packet containing the unique number.

Thereafter, the server apparatus obtains the IP address for the interface of the server apparatus via the interface #2 of the communication device 1. The server apparatus then obtains, in the network including the server apparatus, unique numbers associated with all interfaces provided in the server apparatus connected to the communication devices 2 and 3 and so on. Subsequently, the server apparatus reports, to the IP address assignment control apparatus, the unique number associated with the interface for which the IP address was obtained and the unique numbers associated with all the obtained interfaces of the server apparatus.

The IP address assignment control apparatus obtains, via the interface #2 of the communication device 1, the unique number associated with the interface provided in the server apparatus and is connected to the interface #2 of communication device 1 and the unique numbers associated with the interfaces provided in the server apparatus connected to the interfaces of the communication devices 2 and 3 and so on.

Subsequently, on the basis of the unique number associated with the interface provided in the server apparatus connected to the interface #2 of the communication device 1, the IP address assignment control apparatus stores, in the IP address assignment table, the obtained unique numbers associated with the interfaces provided in the server apparatus connected to the communication devices 2 and 3 and so on.

Thereafter, the IP address assignment control apparatus obtains, from the IP address assignment table, the stored unique numbers and the IP addresses associated with the unique numbers. The IP address assignment control apparatus reports the obtained unique numbers and IP addresses to the management server and instructs the management server so as to register the unique numbers and the IP addresses. In the case, the IP address assignment control apparatus may further instruct the management server so as to report, to the corresponding server apparatus, the IP addresses associated with the unique numbers contained in the information request packet.

Subsequently, the management server registers, in the data management table, the unique numbers and IP addresses reported from the IP address assignment control apparatuses. Thereafter, the server apparatus sends, via at least one interface of the server apparatus, an information request packet containing the unique number(s) associated with interface(s).

The management server then receives the information request packet containing the unique numbers associated with the interfaces of the server apparatus via the communication devices 1, 2, and 3, and then obtains, from the data management table, IP addresses associated with the received unique numbers. Subsequently, the management server sends an information response packet containing the IP addresses to the server apparatus that sent the unique numbers. Thereafter, the server apparatus obtains the IP addresses, associated with the interfaces of the server apparatus, via the interfaces of the communication devices 1, 2, and 3.

The above-described processing is similarly performed on the server apparatuses connected to the interfaces (e.g., interfaces #1 and #3), other than the interface #2, provided in the reference-point communication device 1. Consequently, IP addresses are assigned to all interfaces provided in all server apparatuses.

As described above, the IP address assignment control apparatus may assign IP addresses associated with all interfaces of the server apparatuses in the network, on the basis of the unique number associated with the interface provided in the predetermined communication device serving as a reference point and the unique numbers associated with the interfaces provided in the server apparatus connected to the interface of the reference-point communication device. It is possible to enhance the efficiency of setting involved in IP address assignment, compared to the related art in which IP addresses are individually assigned to the respective interfaces provided in the server apparatuses.

[System Configuration]

Figure 2:
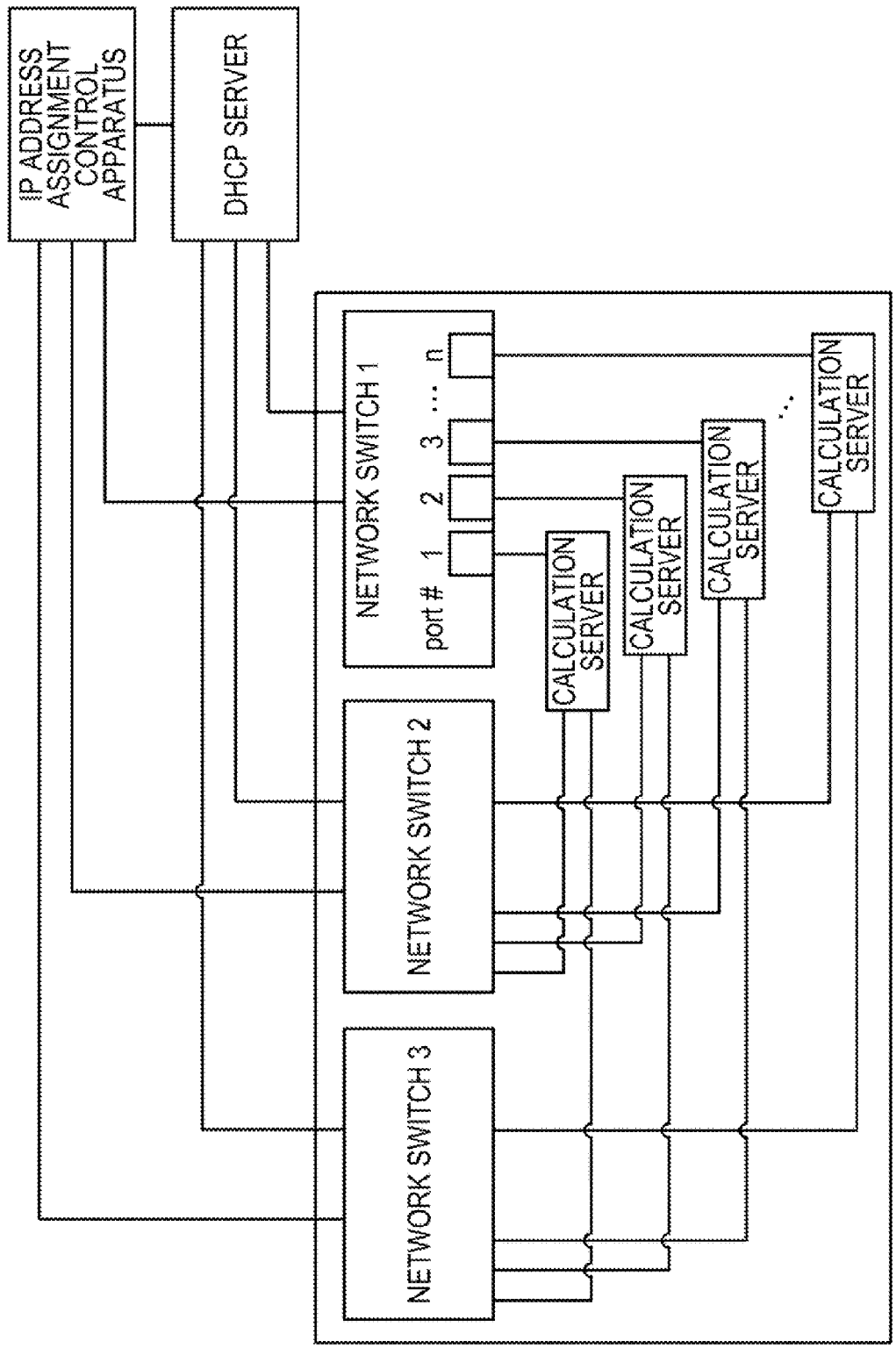
FIG. 2 is a diagram illustrating an example of a system configuration including an IP address assignment control apparatus according to a second embodiment.

A system configuration including an IP address assignment control apparatus according to a second embodiment will first be described with reference to FIG. 2. FIG. 2 is a diagram illustrating an example of a system configuration including an IP address assignment control apparatus according to a second embodiment.

In the system configuration according to the second embodiment, for example, as illustrated in FIG. 2, an IP address assignment control apparatus, a DHCP server, and at least one network switch are connected with each other. FIG. 2 illustrates network switches 1 to 3. The DHCP server in the second embodiment corresponds to the management server in the first embodiment and the network switches in the second embodiment correspond to the communication devices in the first embodiment.

Each network switch is connected to at least one calculation server and serves as a calculation-server consolidation point. Each network switch has ports, each being connected to at least one interface provided in each calculation server. Each calculation server communicates with another calculation server, an external apparatus, and so on via the ports provided in the network switch. In FIG. 2, a network switch 1 has n ports #1 to #n (n is a natural number). The calculation servers in the second embodiment correspond to the server apparatuses in the first embodiment.

Although a case in which three network switches 2 to 3 are provided is illustrated in FIG. 2, more network switches may be provided and the number of which varies depending on the network environment. A description below is given of a case in which a network switch that serves as a predetermined reference point is the network switch 1. The network switch 1 in the second embodiment corresponds to the communication device 1 in the first embodiment.

[Configuration at Data Center]

Figure 3:
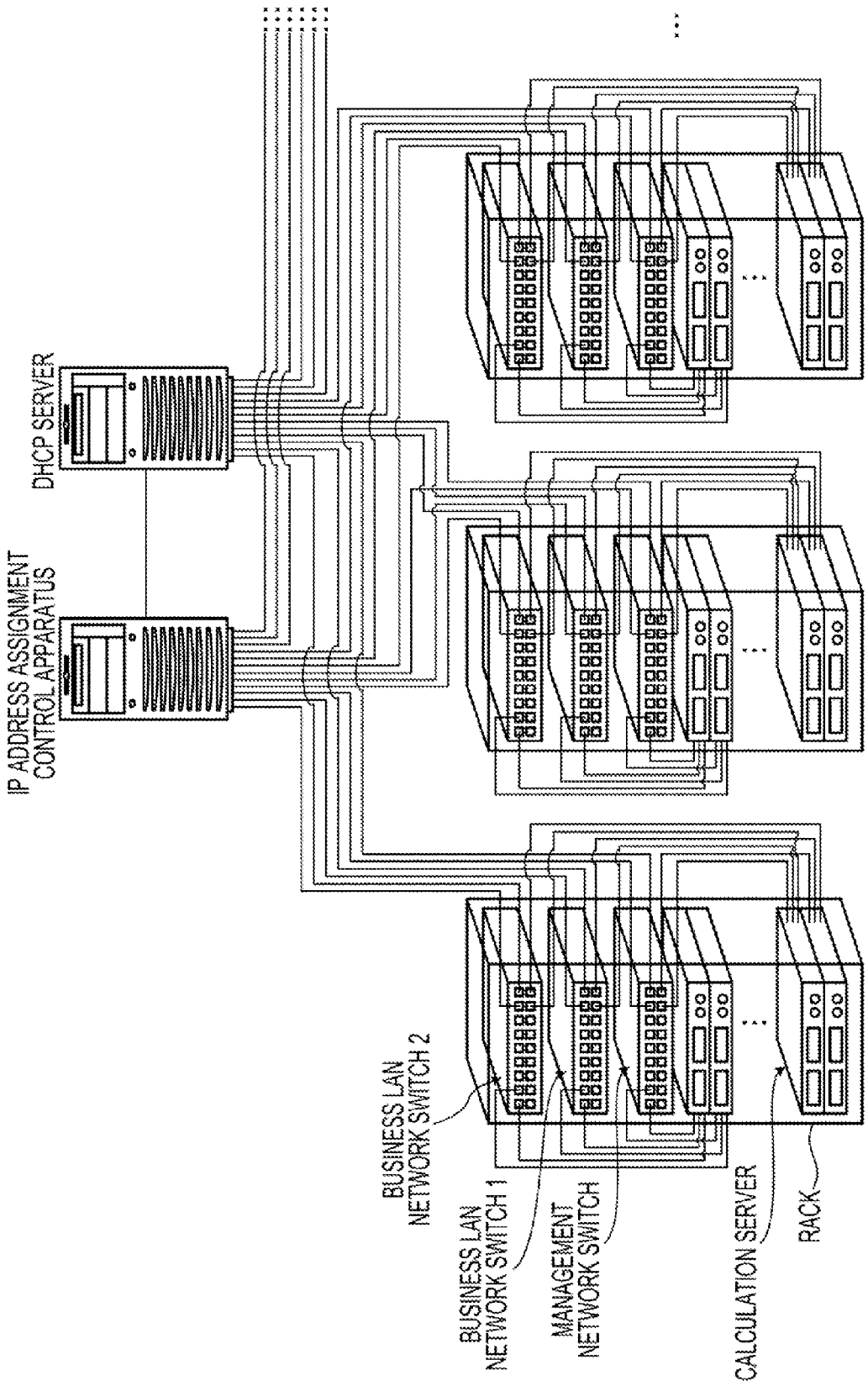
FIG. 3 is a diagram illustrating an example of the configuration at a data center in the system including the IP address assignment control apparatus according to the second embodiment.

The configuration at the data center in the system including the IP address assignment control apparatus according to the second embodiment will be described next with reference to FIG. 3. FIG. 3 is a diagram illustrating an example of the configuration at a data center in the system including the IP address assignment control apparatus according to the second embodiment.

For example, as illustrated in FIG. 3, in the configuration at the data center in the system according to the second embodiment, at least one network switch and at least one calculation server which are illustrated in FIG. 2 are consolidated in a rack. In the configuration of this system, the network switches, the IP address assignment control apparatus, and the DHCP server are connected with each other. At the data center, a plurality of such racks is provided.

In FIG. 3, the network switches include a management LAN (local area network) network switch, a business LAN network switch 1, and a business LAN network switch 2. This management LAN is a network in which, for example, an IPMI (intelligent platform management interface) is used to monitor hardware of the calculation servers to perform, power-supply operation, temperature management, and so on. The configuration illustrated in FIG. 3 has a redundant (duplexed) configuration in which two business LAN network switches are provided.

Although a case in which three network switches are provided is illustrated in FIG. 3, more network switches may be provided and the number of which varies depending on the network environment.

Figure 4:
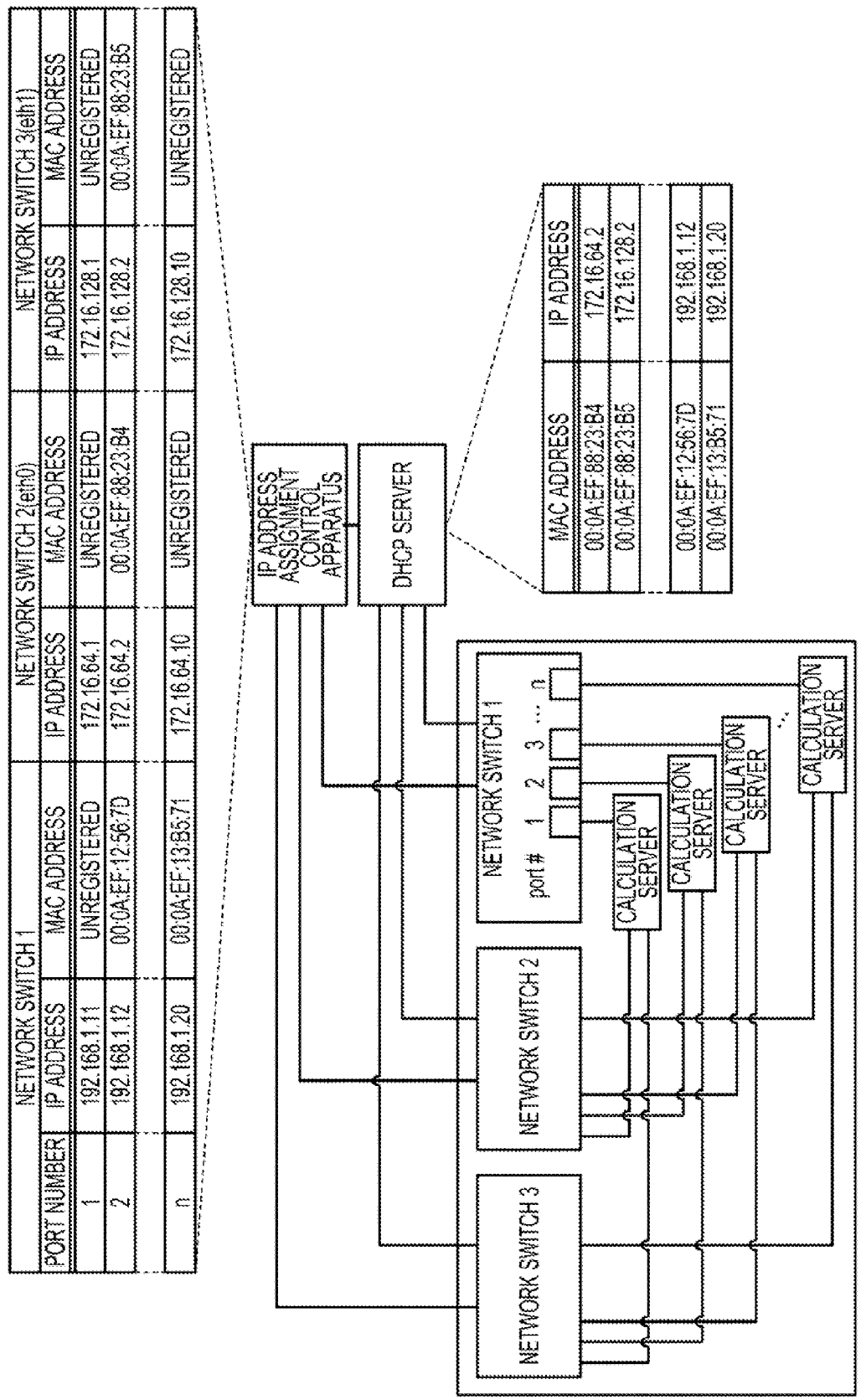
FIG. 4 is a diagram illustrating an example of the structure of data held by apparatuses in the system according to the second embodiment.

Next, the structure of data held by the apparatuses in the system according to the second embodiment will be described with reference to FIG. 4. FIG. 4 is a diagram illustrating an example of the structure of data held by the apparatuses in the system according to the second embodiment.

For example, as illustrated in FIG. 4, the IP address assignment control apparatus according to the second embodiment has an IP address assignment table containing port numbers for identifying the ports #1 to #n provided in the network switch 1 connected. The IP address assignment control apparatus has an IP address assignment table in which the port numbers, IP addresses for the interfaces provided in the calculation servers connected to the ports, and MAC addresses are associated with each other. As an example of the port numbers, the IP addresses, and the MAC addresses, the IP address assignment control apparatus holds data in which a port number "2", an IP address "192.168.1.12", and a MAC address "00:0A:EF:12:56:7D" are associated with each other. The port numbers in the second embodiment correspond to the interface identification numbers in the first embodiment and the MAC addresses in the second embodiment correspond to the unique numbers in the first embodiment.

The IP address assignment control apparatus further has an IP address assignment table in which MAC addresses and IP addresses for the interfaces provided in the calculation servers connected to the ports of the network switches 2 and 3 and so on are associated with each other. As an example of the IP addresses and the MAC addresses associated with the network switch 2, the IP address assignment control apparatus holds data in which an IP address "172.16.64.2" and a MAC address "00:0A:EF:88:23:B4" are associated with each other. As an example of the IP addresses and the MAC addresses associated with the network switch 3, the IP address assignment control apparatus holds data in which an IP address "172.16.128.2" and a MAC address "00:0A:EF:88:23:B5" are associated with each other.

The number of entries in the IP address assignment table provided in the IP address assignment control apparatus varies depending on the environment in which the system is implemented, i.e., depending on the number of network switches and the number of number of interfaces provided in the calculation servers. In other words, when five network switches 1 to 5 are provided, the number of entries in the IP address assignment table increases according to the network switches 1 to 5 and the number of interfaces provided in the calculation servers connected to the network switches 1 to 5.

For example, as illustrated in FIG. 4, the DHCP server is connected to the calculation servers via the ports of each network switch. The DHCP server has a data management table in which MAC addresses for the interfaces of each calculation server and IP addresses are associated with each other. As an example of the MAC addresses and the IP addresses, the DHCP server holds data in which a MAC address "00:0A:EF:88:23:B4" and an IP address "172.16.64.2" are associated with each other.

Figure 5:
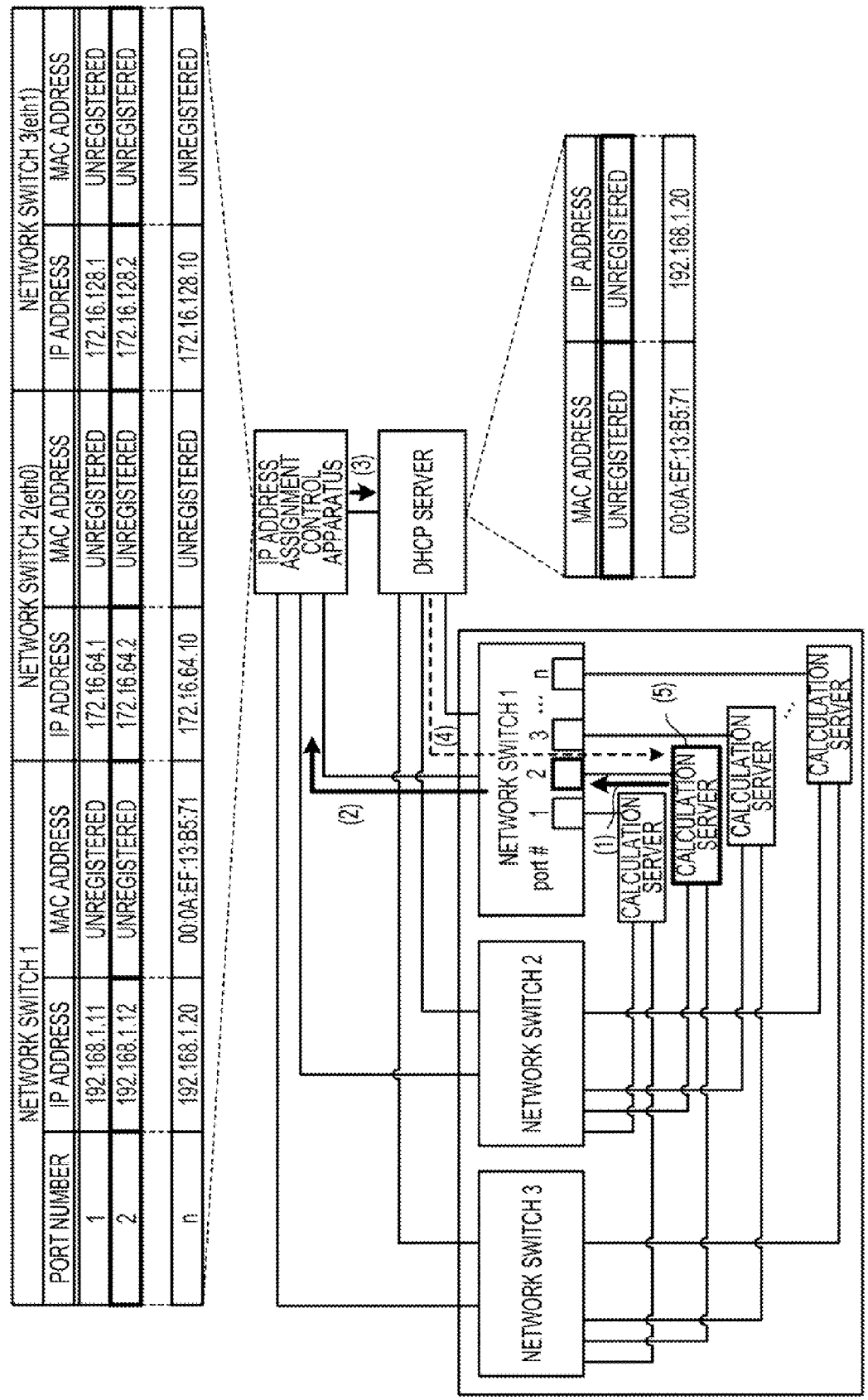
FIG. 5 is a diagram illustrating an example of IP address assignment control processing according to the second embodiment.
Figure 6:
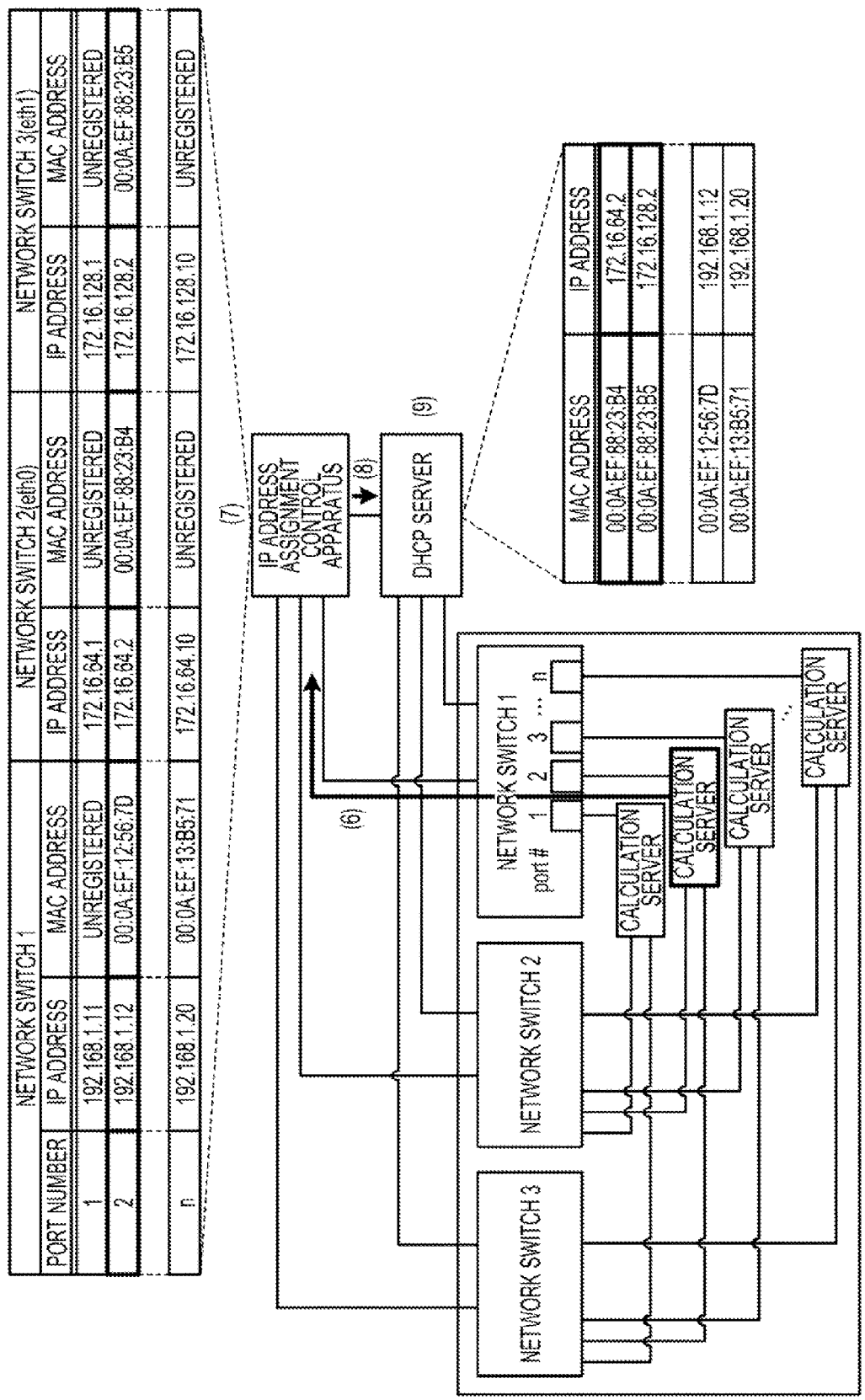
FIG. 6 is a diagram illustrating an example of the IP address assignment control processing according to the second embodiment.
Figure 7:
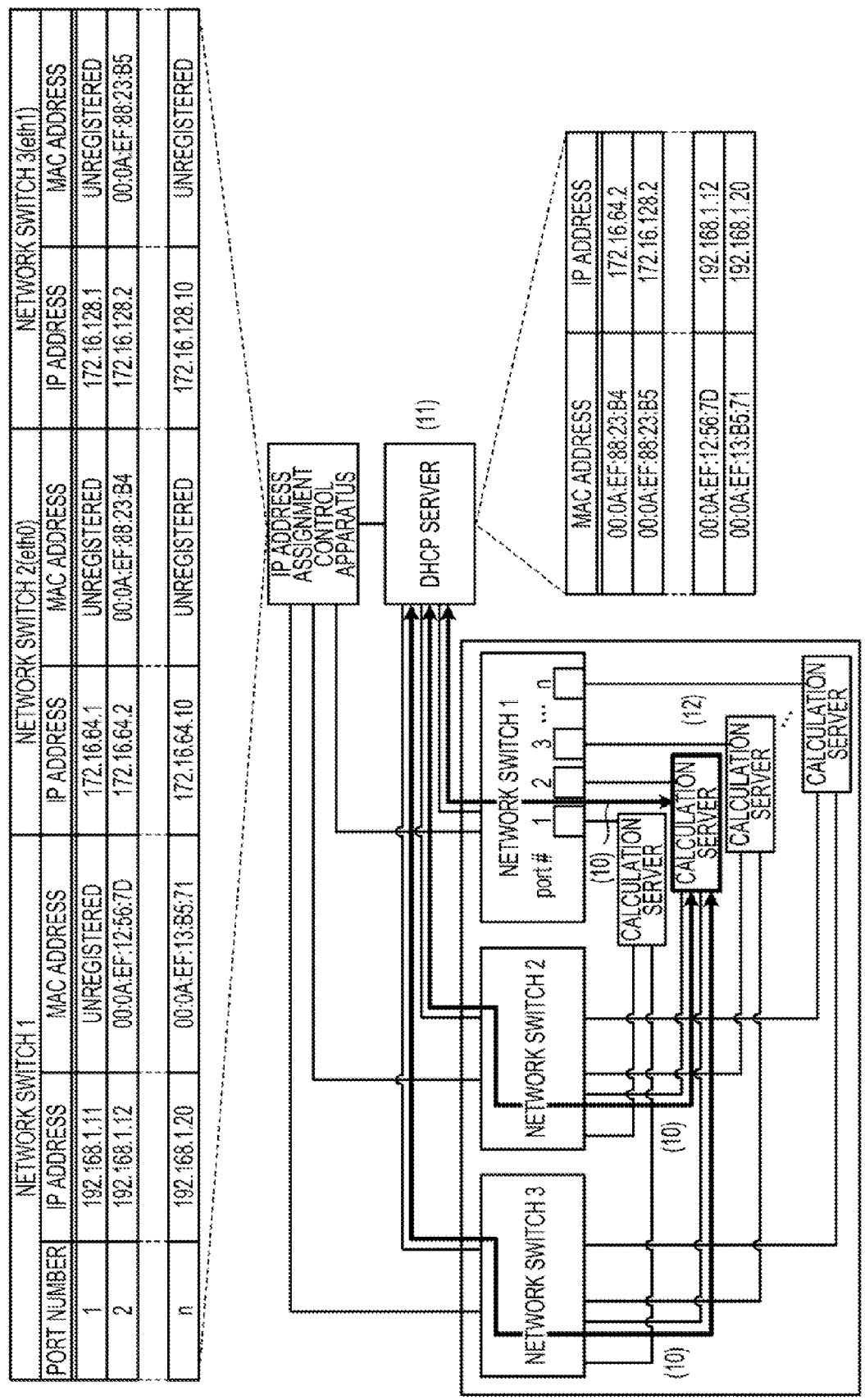
FIG. 7 is a diagram illustrating an example of the IP address assignment control processing according to the second embodiment.

Next, IP address assignment control processing according to the second embodiment will be described with reference to FIGS. 5 to 7. FIGS. 5 to 7 are diagrams illustrating an example of IP address assignment control processing according to the second embodiment.

For example, as illustrated in FIG. 5, the IP address assignment control apparatus is connected to the network switches 1 to 3 and the DHCP server, which is networked with the network switches 1 to 3. Each network switch is connected to at least one calculation server that sends a DHCP request packet to the DHCP server and that has at least one interface.

The IP address assignment control apparatus has an IP address assignment table in which port numbers for identifying the ports provided in the network switch 1 serving as a predetermined reference point, IP addresses for the interfaces of the calculation servers connected to the ports, and MAC addresses are associated with each other. Data held by the IP address assignment control apparatus includes, for example, a port number "2", an IP address "192.168.1.12", and a MAC address "unregistered (data not registered)".

The IP address assignment control apparatus further has an IP address assignment table in which IP addresses for the interfaces provided in the calculation servers connected to the ports of the network switch 2 and MAC addresses are associated with each other. Data held by the IP address assignment control apparatus includes, for example, an IP address "172.16.64.2" and a MAC address "unregistered (data not registered)".

The IP address assignment control apparatus further has an IP address assignment table in which MAC addresses and IP addresses for the interfaces provided in the calculation servers connected to the ports of the network switch 3 are associated with each other. Data held by the IP address assignment control apparatus includes, for example, an IP address "172.16.128.2" and a MAC address "unregistered (data not registered)".

As illustrated in FIG. 5, the DHCP server has a data management table in which MAC addresses and IP addresses are associated with each other. A description below is given based on the assumption that the setting is initial setting and thus the data management table held in the DHCP server has no data.

As illustrated in FIG. 5, each calculation server is connected to the network switches via at least one interface of the calculation server and the port of each network switch. A description below will be given of a case in which the network switch 1 serves as a reference point and the calculation server connected to the port #2 of the network switch 1 operates.

In the above-described configuration, as indicated by (1) in FIG. 5, the calculation server sends a DHCP request packet at regular intervals or upon startup of the calculation server, in accordance with setting. The DHCP request packet contains a MAC address "00:0A:EF:12:56:7D" for the interface of the calculation server. The DHCP request packet in the second embodiment corresponds to the information request packet in the first embodiment.

The DHCP request packet sent by the calculation server is, in one mode, a packet that is broadcast in the network and that requests the DHCP server for an IP address. For example, the calculation server sends the DHCP request packet until it obtains an IP address, periodically sends the DHCP request packet to check an IP address, or sends the DHCP request packet in accordance with a predetermined sending instruction issued from an external apparatus.

As indicated by (2) in FIG. 5, the network switch 1 reports, to the IP address assignment control apparatus, the port number "2" of the port #2 of the network switch 1 and the MAC address "00:0A:EF:12:56:7D" contained in the DHCP request packet sent from the calculation server and received via the port #2.

As described above, in one mode, the DHCP request packet is sent to the DHCP server. Thus, in this case, it is preferable that the network switch 1 be provided with a function that allows a packet-relay routing, filtering, and so on to be set for each port. In short, the network switch 1 reports the DHCP request packet, received by the network switch 1 for the first time, to the IP address assignment control apparatus. However, since the DHCP server may be set so as to ignore a DHCP request packet containing a MAC address that is not registered in the data management table, the network switch 1 does not necessarily have to be provided with the above-described filtering function and so on.

Subsequently, the IP address assignment control apparatus stores, in the held IP address assignment table, the MAC address "00:0A:EF:12:56:7D" associated with the port number "2" reported from the network switch 1. Thereafter, the IP address assignment control apparatus obtains, from the IP address assignment table, the stored MAC address "00:0A:EF:12:56:7D" and the IP address "192.168.1.12" associated with the MAC address. As indicated by (3) in FIG. 5, the IP address assignment control apparatus then reports the obtained IP address "192.168.1.12" and MAC address "00:0A:EF:12:56:7D" to the DHCP server and instructs the DHCP server so as to register the IP address and the MAC address.

Subsequently, as illustrated in FIG. 5, the DHCP server stores, in the data management table, the MAC address "00:0A:EF:12:56:7D" and the IP address "192.168.1.12" reported from the IP address assignment control apparatus. Thereafter, as indicated by (4) in FIG. 5, the DHCP server sends the corresponding IP address "192.168.1.12" to the calculation server via the port #2 of the network switch 1 as a DHCP response packet for the DHCP request packet containing the MAC address "00:0A:EF:12:56:7D".

Thereafter, as indicated by (5) in FIG. 5, the calculation server obtains the IP address "192.168.1.12" for the interface of the calculation server via the port #2 of the network switch 1. With the obtained IP address, the calculation server may perform communication with another calculation server, an external apparatus, and so on to be connected.

Subsequently, as indicated by (6) in FIG. 6, the calculation server obtains MAC addresses associated with all interfaces provided in the calculation server connected to the network switches 2 and 3 and so on in the network including the calculation server. The MAC addresses obtained are, for example, a MAC address "00:0A:EF:88:23:B4" for the interface provided in the calculation server connected to the network switch 2 and a MAC address "00:0A:EF:88:23:B5" for the interface provided in the calculation server connected to the network switch 3.

After obtaining the MAC addresses, the calculation server reports, to the IP address assignment control apparatus, the MAC address "00:0A:EF:12:56:7D" for the interface for which the IP address "192.168.1.12" was obtained and the obtained MAC addresses "00:0A:EF:88:23:B4" and "00:0A:EF:88:23:B5". In this case, the calculation server uses the obtained IP address "192.168.1.12" to communicate with the IP address assignment control apparatus.

As a result of the reporting from the calculation server, the IP address assignment control apparatus obtains the MAC address "00:0A:EF:12:56:7D" for the interface, provided in the calculation server connected to the port #2 of the network switch 1, as indicated by (7) in FIG. 6.

Similarly, the IP address assignment control apparatus obtains the MAC addresses "00:0A:EF:88:23:B4" and "00:0A:EF:88:23:B5" for the interfaces provided in the calculation server connected to the ports of the network switches 2 and 3 other than the network switch 1. As described above, the IP address assignment control apparatus obtains those MAC addresses reported from the calculation server via the port #2 of the reference-point network switch 1.

Subsequently, the IP address assignment control apparatus stores, in the IP address assignment table, the obtained MAC addresses "00:0A:EF:88:23:B4" and "00:0A:EF:88:23:B5" for the interfaces provided in the calculation server connected to the ports of the network switches 2 and 3. In the IP address assignment table, the MAC address "00:0A:EF:12:56:7D" for the interface provided in the calculation server connected to the port #2 of the network switch 1 is used as a key.

Thereafter, the IP address assignment control apparatus obtains, from the IP address assignment table, the stored MAC address "00:0A:EF:88:23:B4" and the IP address "172.16.64.2" associated with the MAC address. Thereafter, as indicated by (8) in FIG. 6, the IP address assignment control apparatus reports the obtained MAC address "00:0A:EF:88:23:B4" and IP address "172.16.64.2" to the DHCP server and instructs the DHCP server so as to register the MAC address and the IP address.

The IP address assignment control apparatus also obtains, from the IP address assignment table, the stored MAC address "00:0A:EF:88:23:B5" and the IP address "172.16.128.2" associated with the MAC address. The IP address assignment control apparatus then reports the obtained MAC address "00:0A:EF:88:23:B5" and IP address "172.16.128.2" to the DHCP server and instructs the DHCP server so as to register the MAC address and the IP address.

In this case, the DHCP server reports the IP addresses to the calculation server by using a DHCP response packet, which is a response packet for the DHCP request packet. The IP address assignment control apparatus may further instruct the DHCP server so as to report, to the corresponding calculation server, the IP addresses associated with the MAC addresses contained in the DHCP request packet.

Subsequently, as indicated by (9) in FIG. 6, the DHCP server registers, in the data management table, the MAC address "00:0A:EF:88:23:B4" and the IP address "172.16.64.2" reported from the IP address assignment control apparatus. The DHCP server also registers, in the data management table, the MAC address "00:0A:EF:88:23:B5" and the IP address "172.16.128.2" reported from the IP address assignment control apparatus.

Thereafter, as indicated by (10) in FIG. 7, the calculation server sends, from the interfaces thereof, a DHCP request packet containing the MAC addresses "00:0A:EF:12:56:7D", "00:0A:EF:88:23:B4", and "00:0A:EF:88:23:B5" for the corresponding interfaces.

The MAC address "00:0A:EF:12:56:7D" sent from the calculation server is a MAC address for the interface provided in the calculation server connected to the port #2 of the reference-point network switch 1. The MAC address "00:0A:EF:88:23:B4" sent from the calculation server corresponds to the interface provided in the calculation server connected to the port of network switch 2. The MAC address "00:0A:EF:88:23:B5" sent from the calculation server corresponds to the interface provided in the calculation server connected to the port of network switch 3.

Thereafter, as indicated by (11) in FIG. 7, the DHCP server receives the MAC address "00:0A:EF:12:56:7D" for the interface of the calculation server via the port #2 of the network switch 1. Subsequently, the DHCP server obtains, from the data management table, the IP address "192.168.1.12" associated with the received MAC address "00:0A:EF:12:56:7D". The DHCP server then reports a DHCP response packet containing the obtained IP address "192.168.1.12" to the calculation server that sent the DHCP request packet via the network switch 1.

The DHCP server also receives the MAC address "00:0A:EF:88:23:B4 for the interface of the calculation server via the port of the network switch 2. The DHCP server then obtains, from the data management table, the IP address "172.16.64.2" associated with the received MAC address "00:0A:EF:88:23:B4. Subsequently, the DHCP server reports a DHCP response packet containing the obtained IP address "172.16.64.2" to the calculation server that sent the DHCP request packet via the network switch 2.

The DHCP server also receives the MAC address "00:0A:EF:88:23:B5 for the interface of the calculation server via the port of the network switch 3. The DHCP server then obtains, from the data management table, the IP address "172.16.128.2" associated with the received MAC address "00:0A:EF:88:23:B5. Subsequently, the DHCP server reports a DHCP response packet containing the obtained IP address "172.16.128.2" to the calculation server that sent the DHCP request packet via the network switch 3.

Thereafter, as indicated by (12) in FIG. 7, the calculation server obtains the IP address "172.16.64.2" for the interface of the calculation server via the port of the network switch 2. The calculation server having the interface for which the IP address "172.16.64.2" was obtained may perform communication with another calculation server, an external apparatus, and so on to be connected, by using the IP address "172.16.64.2" for the interface.

The calculation server obtains the IP address "172.16.128.2" for the interface of the calculation server via the port of the network switch 3. The calculation server having the interface for which the IP address "172.16.128.2" was obtained may perform communication with another calculation server, an external apparatus, and so on to be connected, by using the IP address "172.16.128.2" for the interface.

Since the IP address to be obtained via the port #2 of the network switch 1 has already been obtained in the above description, the description thereof is omitted.

That is, on the basis of the port provided in the predetermined network switch serving as a reference point and the MAC address for the interface provided in the calculation server connected to the port, the IP address assignment control apparatus may assign IP addresses for all interfaces provided in the calculation server placed in the network. Thus, it is possible to enhance the efficiency of setting involved in IP address assignment.

Through the use of the positions of the ports provided in the predetermined network switch serving as a reference point, the IP address assignment control apparatus may assign IP addresses without holding the information of the positions of the ports of the network switches that are not reference points even in the multiple-channel environment. Thus, compared to the related art in which information of the positions of the ports provided in the individual network switches is held in order to individually provide the interfaces of the calculation servers with IP addresses, the IP address assignment control apparatus may improve the efficiency of setting involved in IP address assignment.

In other words, the IP address assignment control apparatus allows the calculation server to connect an arbitrary port without holding association relationships between the ports provided in the network switches other than the reference-point network switch that is to be visually checked by an administrator or the like and the connection ports for the interfaces of the calculation servers connected to the ports, i.e., without recognizing the association relationships with the ports provided in the network switches other than the reference-point network switch. Thus, it is possible to suppress an increase in the administrator's erroneous setting and an increase in the number of work operations.

Figure 8:
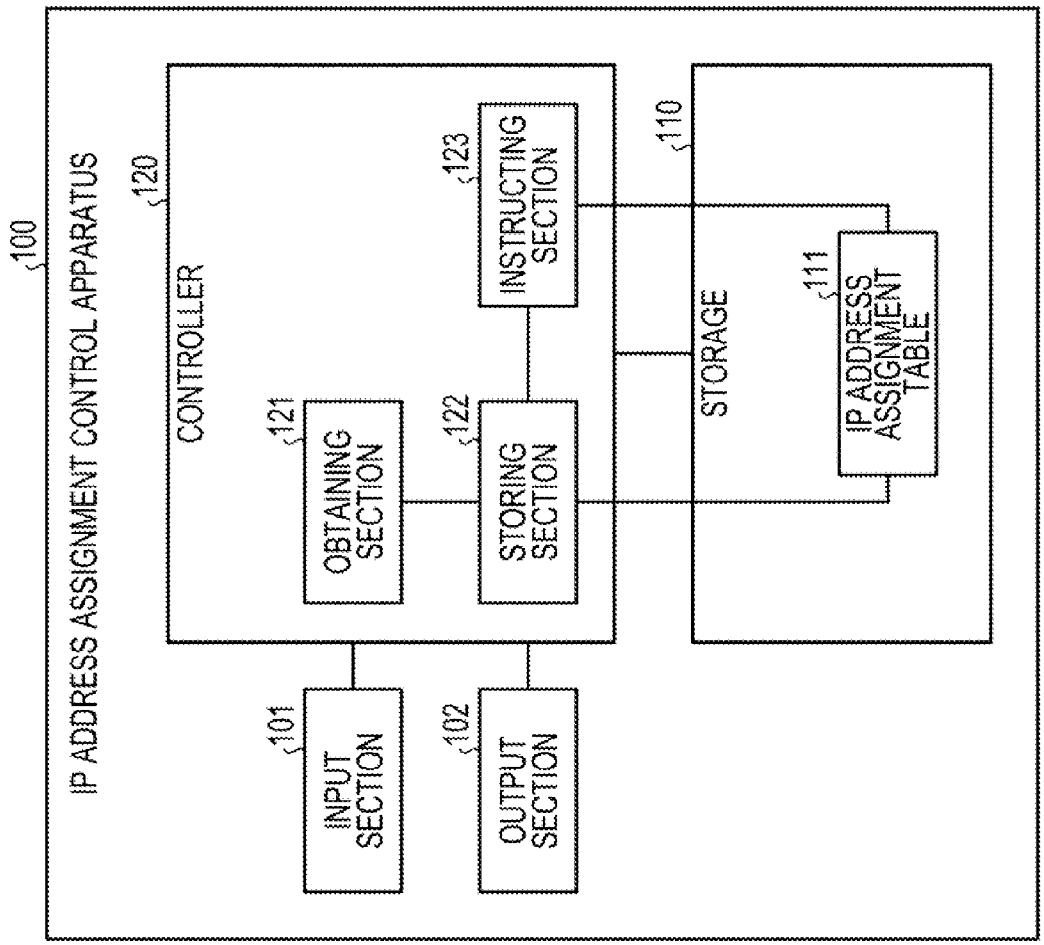
FIG. 8 is a diagram illustrating an example of the configuration of the IP address assignment control apparatus according to the second embodiment.

Next, the configuration of the IP address assignment control apparatus according to the second embodiment will be described with reference to FIG. 8. FIG. 8 is a diagram illustrating an example of the configuration of the IP address assignment control apparatus according to the second embodiment.

As illustrated in FIG. 8, an IP address assignment control apparatus 100 includes an input section 101, an output section 102, a storage 110, and a controller 120. The IP address assignment control apparatus 100 is networked with at least one network switch and a DHCP server, which is networked with the network switch. Each network switch is connected to at least one calculation server that sends a DHCP request packet to the DHCP server and that has at least one interface.

A description below will be given of a case of a multi-channel environment in which a network switch 1 serving as predetermined reference point, which is a predetermined communication device, and network switches 2 and 3, which are communication devices different from the predetermined communication device, are provided.

The input section 101 has, for example, a keyboard and a mouse to receive various types of information input at the IP address assignment control apparatus 100. The output section 102 has, for example, a monitor (or a display, a touch panel, or the like) and a speaker to output various types information at the IP address assignment control apparatus 100.

The storage 110 stores data to be used for various types of processing to be performed by the controller 120 and results of the processing performed by the controller 120. In particular, the storage 110 stores an IP address assignment table 111.

For example, as illustrated in FIG. 9, the IP address assignment table 111 has a data structure containing port numbers that serve as numbers for identifying the ports of the reference-point network switch 1 connected to the IP address assignment control apparatus 100. The IP address assignment table 111 has a data structure in which port numbers, IP addresses for the interfaces provided in the calculation servers connected to the ports of the reference-point network switch 1, and MAC addresses are associated with each other.

As an example of the port numbers, the IP addresses, and the MAC addresses, the IP address assignment table 111 stores data in which a port number "2", an IP address "192.168.1.12", and a MAC address "00:0A:EF:12:56:7D" are associated with each other.

The IP address assignment table 111 further has a data structure in which MAC addresses and IP addresses for the interfaces provided in the calculation servers connected to the ports of the network switches other than the reference-point network switch 1 are associated with each other. As an example of the IP addresses and the MAC addresses, the IP address assignment table 111 stores data in which an IP address "172.16.64.2" and a MAC address "unregistered (data not registered)" are associated with each other.

The numbers of data entries stored in the IP address assignment table 111 is increased according to the number of network switches. An administrator or the like at the data center pre-sets the IP addresses corresponding to the number of data entries in the IP address assignment table 111. FIG. 9 illustrates an example of the data stored in the IP address assignment table 111.

The controller 120 has an internal memory for storing a control program, a program specifying various processing procedures and so on, and any other desired data. The controller 120 has an obtaining section 121, a storing section 122, and an instructing section 123, which execute various types of processing.

For example, the obtaining section 121 obtains the MAC address "00:0A:EF:12:56:7D" for the interface provided in the calculation server connected to port #2 of the network switch 1.

The obtaining section 121 also obtains the MAC addresses "00:0A:EF:88:23:B4" and "00:0A:EF:88:23:B5" for the interfaces provided in the calculation server connected to the ports of the network switches 2 and 3 other than the network switch 1. The MAC addresses are obtained via the port #2 of the reference-point network switch 1.

The storing section 122 stores, in the IP address assignment table 111, the MAC addresses "00:0A:EF:88:23:B4" and "00:0A:EF:88:23:B5" obtained by the obtaining section 121. In the IP address assignment table 111, the MAC address "00:0A:EF:12:56:7D" for the interface provided in the calculation server connected to the port #2 of the network switch 1 is used as a key.

Subsequently, the instructing section 123 obtains, from the IP address assignment table 111, the MAC address "00:0A:EF:88:23:B4" stored in the storing section 122 and the IP address "172.16.64.2" associated with the MAC address. Thereafter, the instructing section 123 reports the obtained MAC address "00:0A:EF:88:23:B4" and IP address "172.16.64.2" to the DHCP server and instructs the DHCP server so as to register the MAC address and the IP address.

The instructing section 123 also obtains, from the IP address assignment table 111, the MAC address "00:0A:EF:88:23:B5" stored in the storing section 122 and the IP address "172.16.128.2" associated with the MAC address. The instructing section 123 then reports the obtained MAC address "00:0A:EF:88:23:B5" and IP address "172.16.128.2" to the DHCP server and instructs the DHCP server so as to register the MAC address and the IP address.

The IP addresses are reported to the calculation server through the use of a DHCP response packet, which is a response packet for the DHCP request packet. In this case, the instructing section 123 may further instruct the DHCP server so as to report, to the corresponding calculation server, the IP addresses associated with the MAC addresses contained in the DHCP request packet sent from the calculation server.

Figure 10:
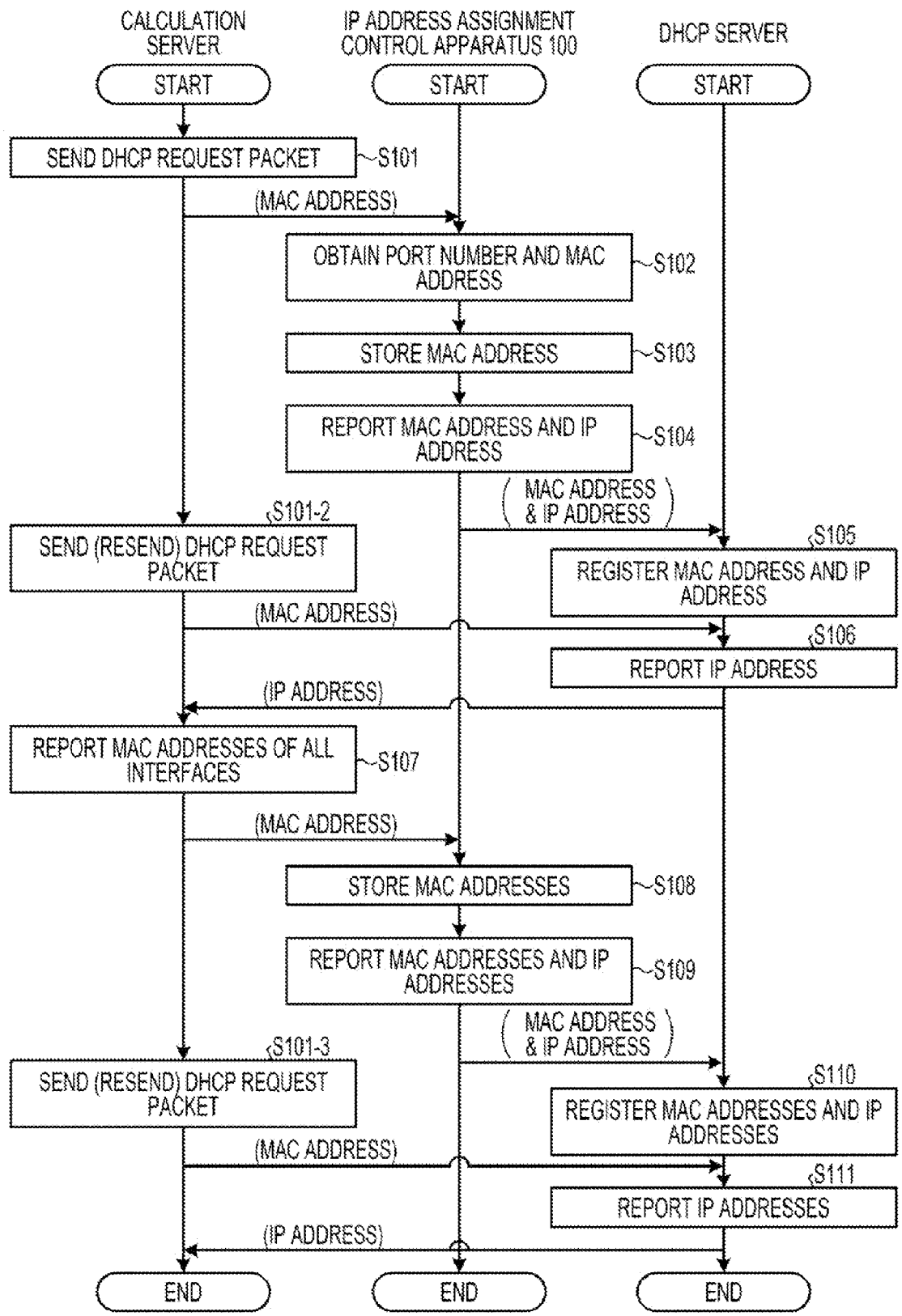
FIG. 10 is a sequence diagram illustrating a flow of the IP address assignment control processing according to the second embodiment.

Next, a flow of the IP address assignment control processing according to the second embodiment will be described with reference to FIG. 10. FIG. 10 is a sequence diagram illustrating a flow of the IP address assignment control processing according to the second embodiment.

As illustrated in FIG. 10, for example, in S101, the calculation server connected to the reference-point network switch sends a DHCP request packet containing the MAC address for the interface connected to the port of the reference-point network switch. The DHCP request packet is sent to the IP address assignment control apparatus 100, the DHCP server, and so on via the port of the reference-point network switch. The DHCP request packet is sent at regular or irregular intervals or at the time of a predetermined operation of the calculation server, in accordance with system setting. The DHCP request packet is, for example, used to request the DHCP server connected to the calculation server so as to send an IP address.

In S102, the IP address assignment control apparatus 100 detects the DHCP request packet sent from the calculation server and obtains the MAC address contained in the detected DHCP request packet and the port number for identifying the port via which the DHCP request packet was sent.

In S103, the IP address assignment control apparatus 100 stores the obtained MAC address in the IP address assignment table 111 in association with the obtained port number. Subsequently, the IP address assignment control apparatus 100 obtains, from the IP address assignment table 111, the stored MAC address and the IP address associated with the MAC address and reports the obtained MAC address and IP address to the DHCP server in S104.

In S105, the DHCP server registers, in the data management table, the MAC address and IP address reported from the IP address assignment control apparatus 100. The DHCP server adds, to a DHCP response packet that is a response to a DHCP request packet that is sent from the calculation server in S101-2 and that contains the MAC address, an IP address associated with the MAC address, and sends the resulting DHCP response packet including the IP address to the calculation server in S106. The DHCP server may be configured to send the DHCP response packet to the calculation server in response to an instruction from the IP address assignment control apparatus 100 without waiting to receive the DHCP request packet re-sent from the calculation server. In such a case, S101-2 may be eliminated.

The calculation server obtains the IP address reported from the DHCP server, uses the IP address to obtain the MAC addresses for all interfaces of the calculation server, and reports the obtained MAC addresses to the IP address assignment control apparatus 100 in S107.

The IP address assignment control apparatus 100 receives the MAC addresses reported from the calculation server, and stores the received MAC addresses in the IP address assignment table 111 in S108. In the IP address assignment table 111, the MAC address stored in S103 is used as a key. After storing the MAC addresses, the IP address assignment control apparatus 100 obtains, from the IP address assignment table 111, the stored MAC addresses and the IP addresses associated with the MAC addresses, and reports the obtained MAC addresses and IP addresses to the DHCP server in S109.

In S110, the DHCP server registers, in the data management table, the MAC addresses and IP addresses reported from the IP address assignment control apparatus 100. The DHCP server adds, to a DHCP response packet that is a response to a DHCP request packet that is sent from the calculation server in S101-3 and that contains the MAC addresses, IP addresses associated with the MAC addresses, and sends the resulting DHCP response packet to the calculation server in S111. The DHCP server may be configured to send the DHCP response packet to the calculation server in response to an instruction from the IP address assignment control apparatus 100 without waiting to receive the DHCP request packet re-sent from the calculation server. In such a case, S101-3 may be eliminated.

The calculation server receives the DHCP response packet sent from the DHCP server, and then may perform communication with another calculation server, an external apparatus, and so on by using the IP addresses contained in the DHCP response packet.

As described above, the IP address assignment control apparatus 100 assigns IP addresses for the interfaces provided in the calculation server connected to the network switches, on the basis of the positions of the ports provided in the reference-point network switch. Thus, it is possible to enhance the efficiency of setting involved in IP address assignment.

For example, the IP address assignment control apparatus 100 has the IP address assignment table 111 in which port numbers for identifying the ports provided in the reference-point network switch 1 connected to the IP address assignment control apparatus 100, IP addresses for the interfaces provided in the calculation servers connected to the ports, and MAC addresses are associated with each other in conjunction with MAC addresses and IP addresses for the interfaces provided in the calculation servers connected to the network switches other than the reference-point network switch. The IP address assignment control apparatus 100 obtains, via the port #2 of the network switch 1, the MAC address "00:0A: EF:12:56:7D" for the interface provided in the calculation server connected to the port #2 of the network switch 1 and the MAC addresses "00:0A:EF:88:23:B4" and "00:0A:EF:88:23:B5" for the interfaces provided in the calculation server connected to the ports of the network switches 2 and 3 other than the network switch 1. Subsequently, the IP address assignment control apparatus 100 stores the obtained MAC addresses "00:0A:EF:88:23:B4" and "00:0A:EF:88:23:B5" in the IP address assignment table 111 in which the MAC address "00:0A:EF:12:56:7D" for the interface provided in the calculation server connected to the port #2 of the network switch 1 is used as a key. Thereafter, the IP address assignment control apparatus 100 obtains, from the IP address assignment table 111, the IP addresses "172.16.64.2" and "172.16.128.2" associated with the stored MAC addresses. The IP address assignment control apparatus 100 then reports the obtained MAC addresses and IP addresses to the DHCP server and instructs the DHCP server so as to register the MAC addresses and the IP addresses. As a result, the IP address assignment control apparatus 100 may enhance the efficiency of setting involved in IP address assignment.

Although embodiments of the IP address assignment control apparatus disclosed herein has been described above, the IP address assignment control apparatus may take various forms other than that in the above-described embodiment. A description below is given of another embodiment in connection with (1) Use of Tentative IP Address, (2) Configuration of IP Address Assignment Control Apparatus, and (3) Program.

(1) Use of Tentative IP Address

Although a case in which the DHCP request packet sent from the calculation server is reported to the IP address assignment control apparatus via the network switch has been described in the second embodiment described above, the DHCP request packet sent from the calculation server may also be reported to the DHCP server.

For example, the DHCP server holds, in the data management table in which MAC addresses and IP addresses are associated with each other, MAC addresses for the interfaces provided in the calculation servers connected to the reference-point network switch and tentative IP addresses to be temporarily assigned. Upon receiving the DHCP request packet sent from the calculation server, the DHCP server sends a DHCP response packet containing the corresponding tentative IP address.

On the other hand, the calculation server receives the DHCP response packet containing the tentative IP address, and then may perform communication with the IP address assignment control apparatus 100 and another calculation server in the network by using the tentative IP address. Thus, the calculation server obtains the MAC addresses for all interfaces provided in the calculation server and reports the obtained MAC addresses to the IP address assignment control apparatus 100.

The IP address assignment control apparatus 100 obtains the MAC addresses reported from the calculation server, obtains association relationships between the MAC addresses and IP addresses from the IP address assignment table 111, and reports the obtained MAC addresses and IP addresses to the DHCP server.

The DHCP server registers, in the data management table, the MAC addresses and IP addresses reported from the IP address assignment control apparatus 100, and sends a DHCP response packet containing corresponding IP addresses as a response to the DHCP request packet sent from the connected calculation server.

Thereafter, the calculation server receives the DHCP response packet, and then may perform communication with another calculation server, an external apparatus, and so on by using the obtained IP addresses.

The DHCP server that assigns the tentative IP addresses is set so as to discard data of the assigned IP addresses and MAC addresses or so as not to assign the IP addresses when the received DHCP request packet is not one received for the first time.

In short, assigning the tentative address as an IP address for an interface provided in the calculation server connected to the reference-point network switch makes it possible to further simplify the processing. Thus, it is possible to further enhance the setting involved in IP address assignment.

(2) Configuration of IP Address Assignment Control Apparatus

The processing procedures, control procedures, specific names, and information ((e.g., the IP address assignment table 111) including various types of data and parameters) which are described hereinabove and/or illustrated in the figures may be arbitrary modified or changed, unless otherwise particularly stated. For example, the data stored in the IP address assignment table 111 varies depending on the implemented-network environment, for example, depending on the number of network switches.

The elements of the illustrated apparatuses are merely functional concepts and do not necessarily have to be physically configured as illustrated. That is, specific forms of distribution/integration of the apparatuses are not limited to those illustrated, and all or a portion thereof may be functionally or physically distributed or integrated in an arbitrary manner, depending on various loads, a use state, and so on. For example, the instructing section 123 may be divided into a unique-information obtaining section for obtaining, from the IP address assignment table 111, an MAC address stored in the storing section 122 and an IP address associated with the MAC address and an instructing section for reporting the MAC address and IP address, obtained by the unique-information obtaining section, to the DHCP server and instructing the DHCP server to register the MAC address and IP address. In addition, all or any of the processing functions of each apparatus may be realized by a CPU (central processing unit) and a program analyzed and executed thereby or may be realized by wired-logic-based hardware.

The system including the IP address assignment control apparatus 100 may be configured such that the IP address assignment control apparatus 100 is included in the DHCP server.

Figure 11:
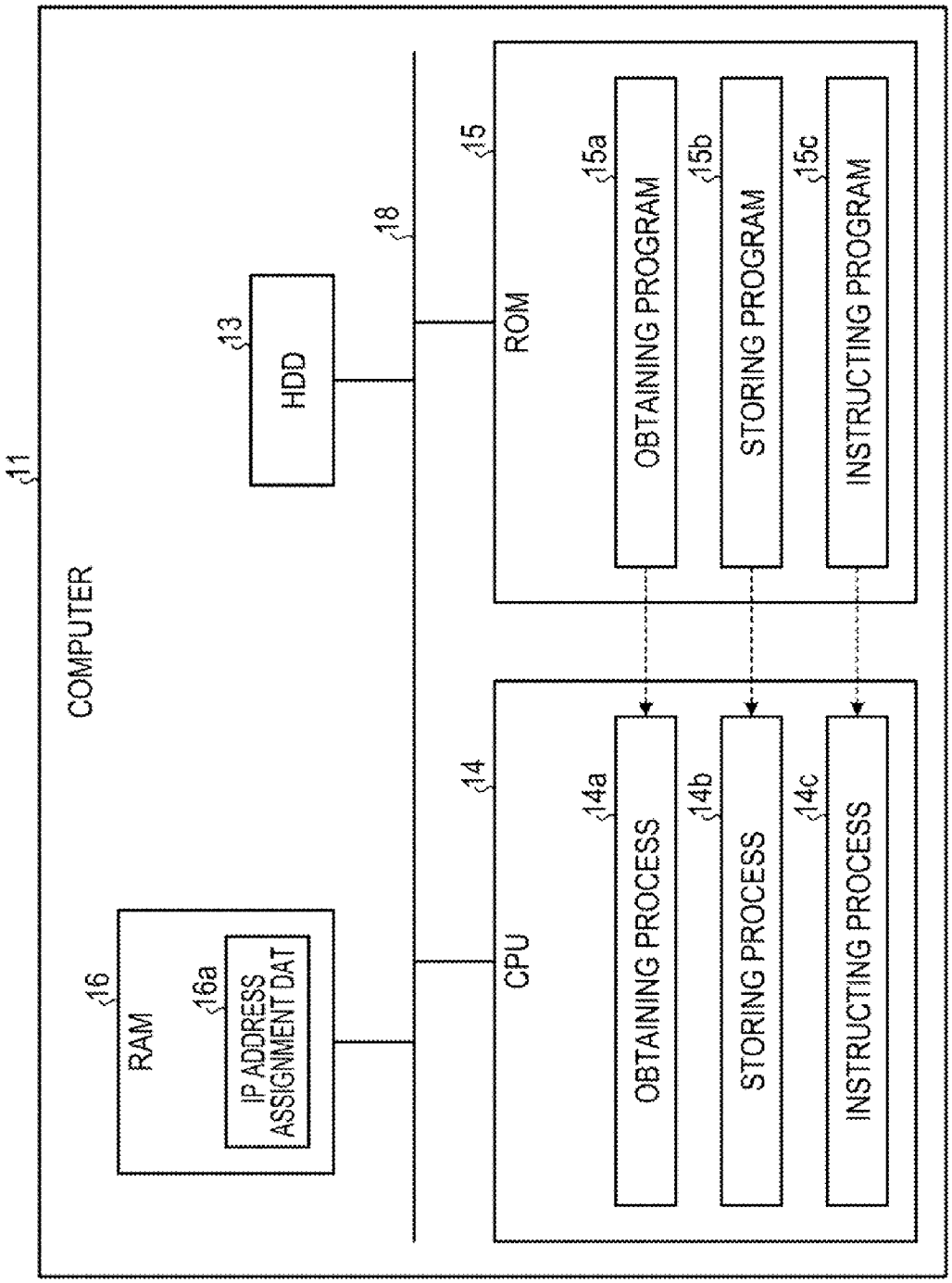
FIG. 11 is a diagram illustrating a computer for executing an IP address assignment control program.
Figure 12:
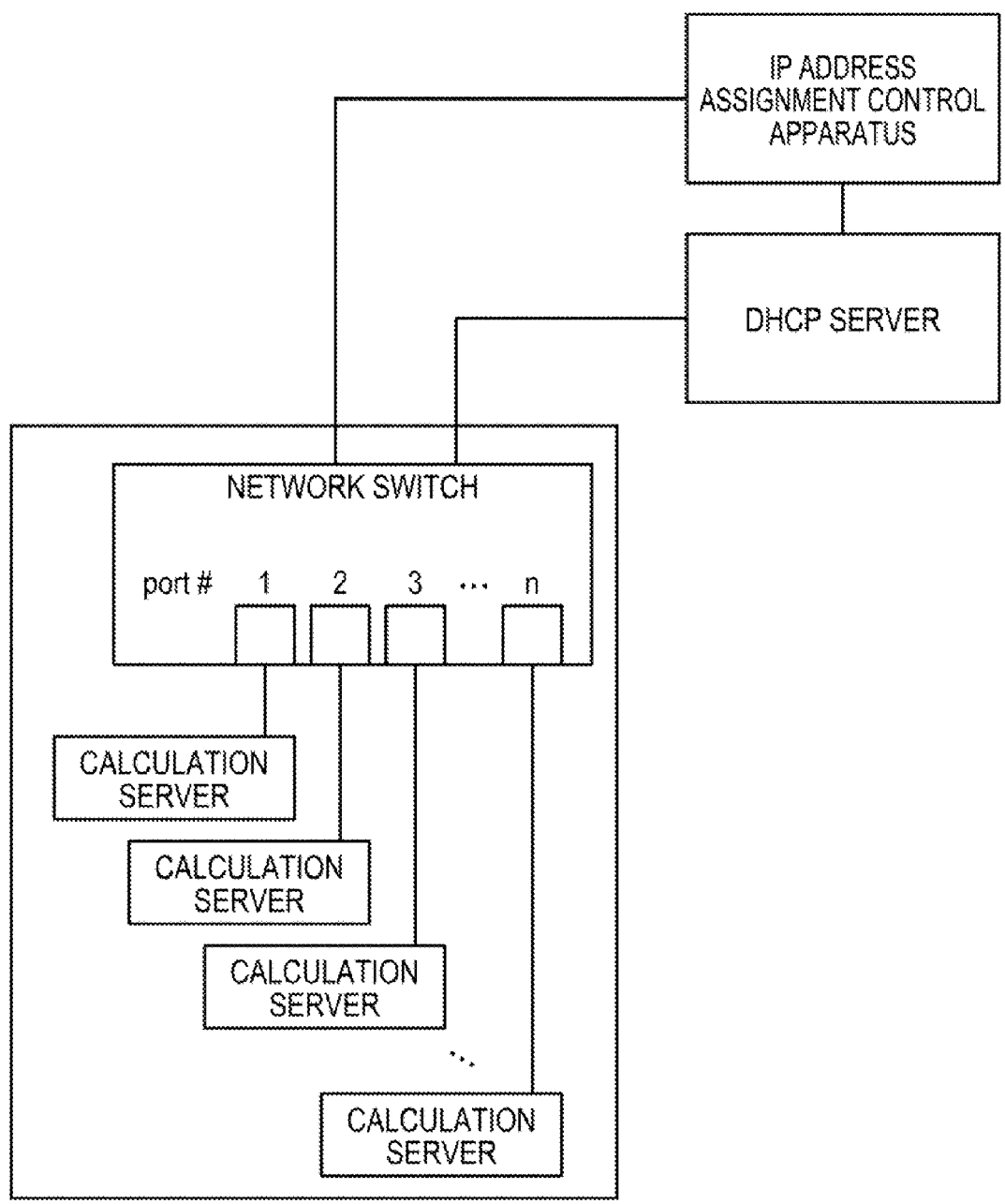
FIG. 12 is a diagram illustrating an example of a system configuration including an IP address assignment control apparatus of related art.
Figure 13:
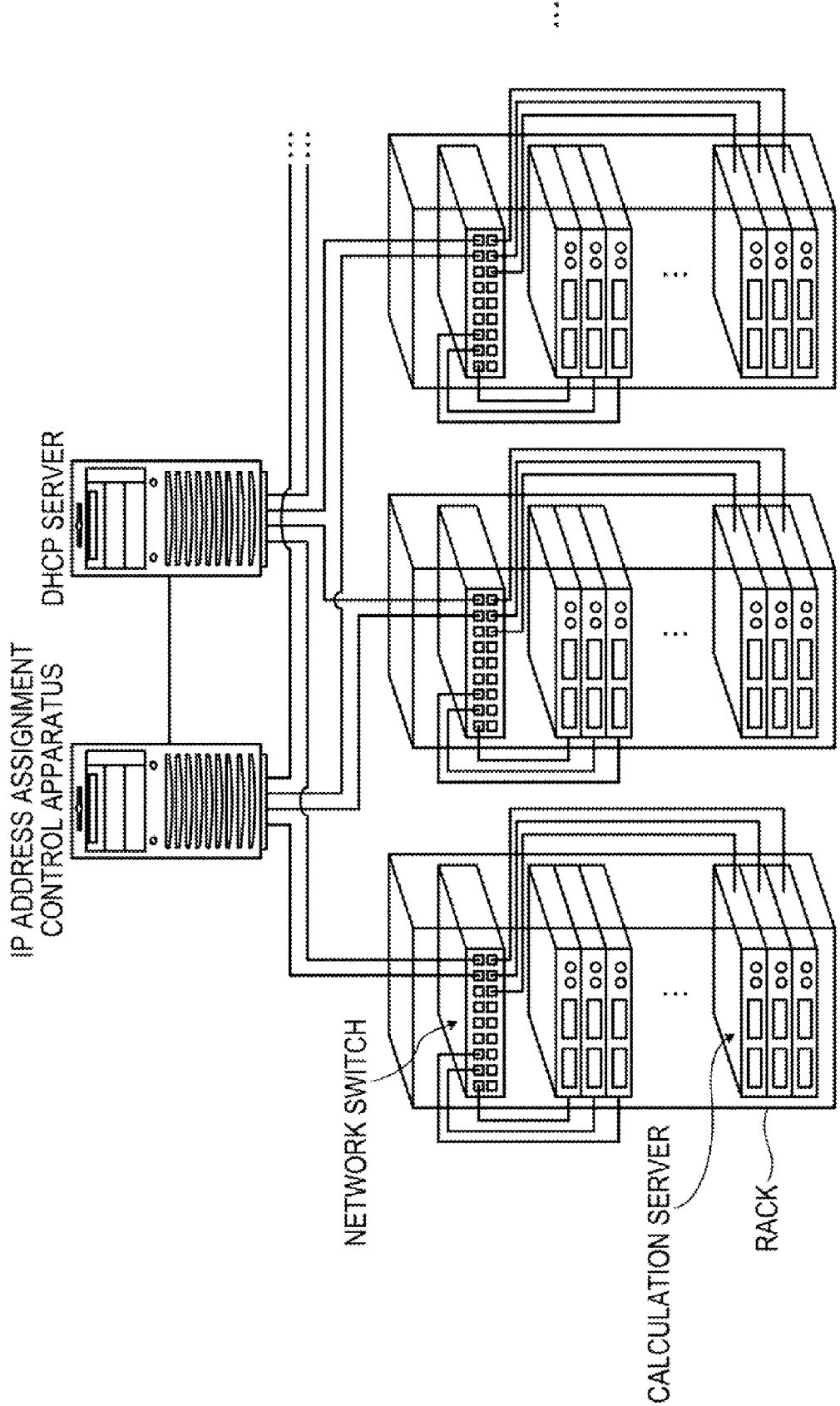
FIG. 13 is a diagram illustrating an example of the configuration at a data center in the system including the IP address assignment control apparatus of the related art.
Figure 14:
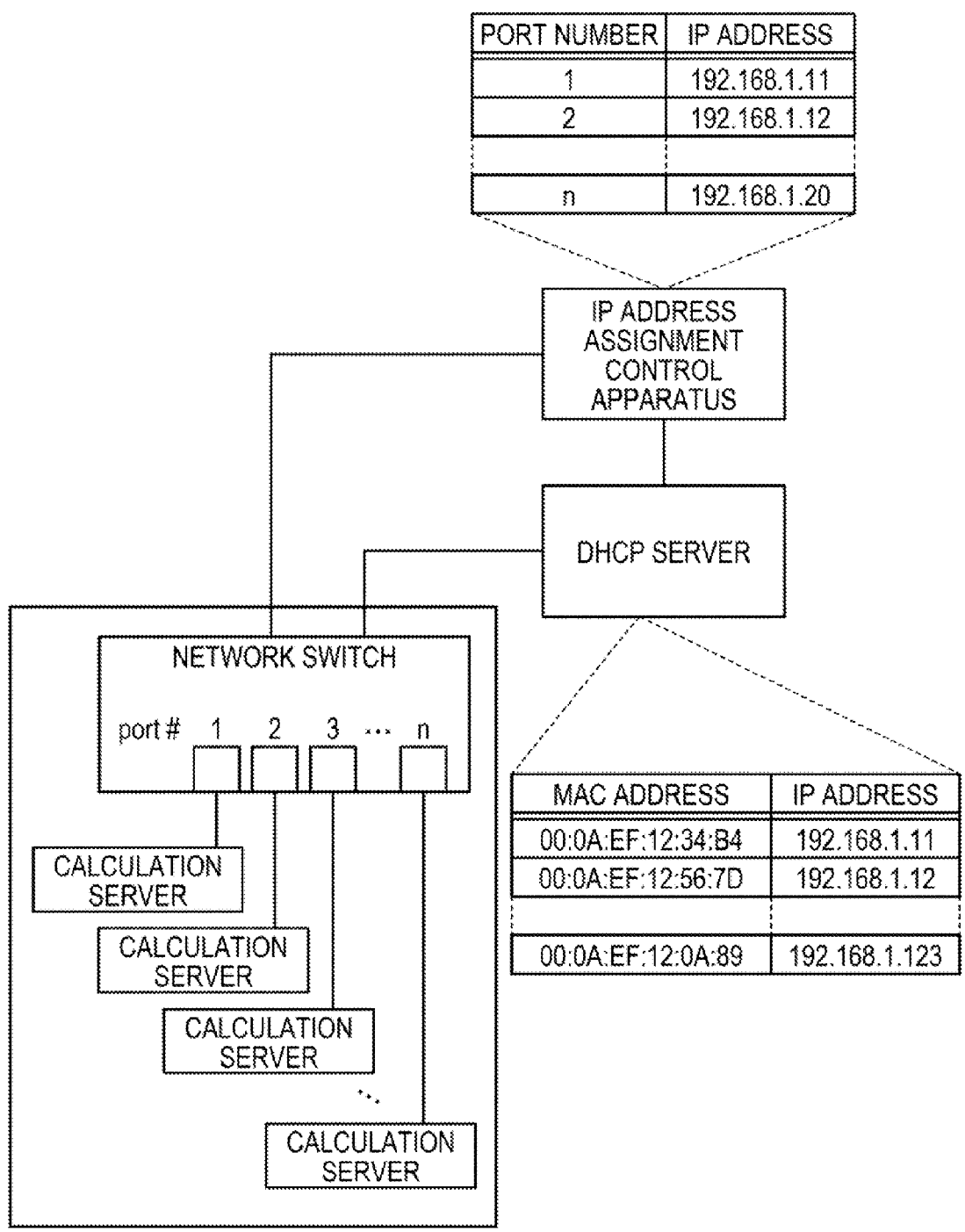
FIG. 14 is a diagram illustrating an example of the structure of data held by the apparatuses of the related art.
Figure 15:
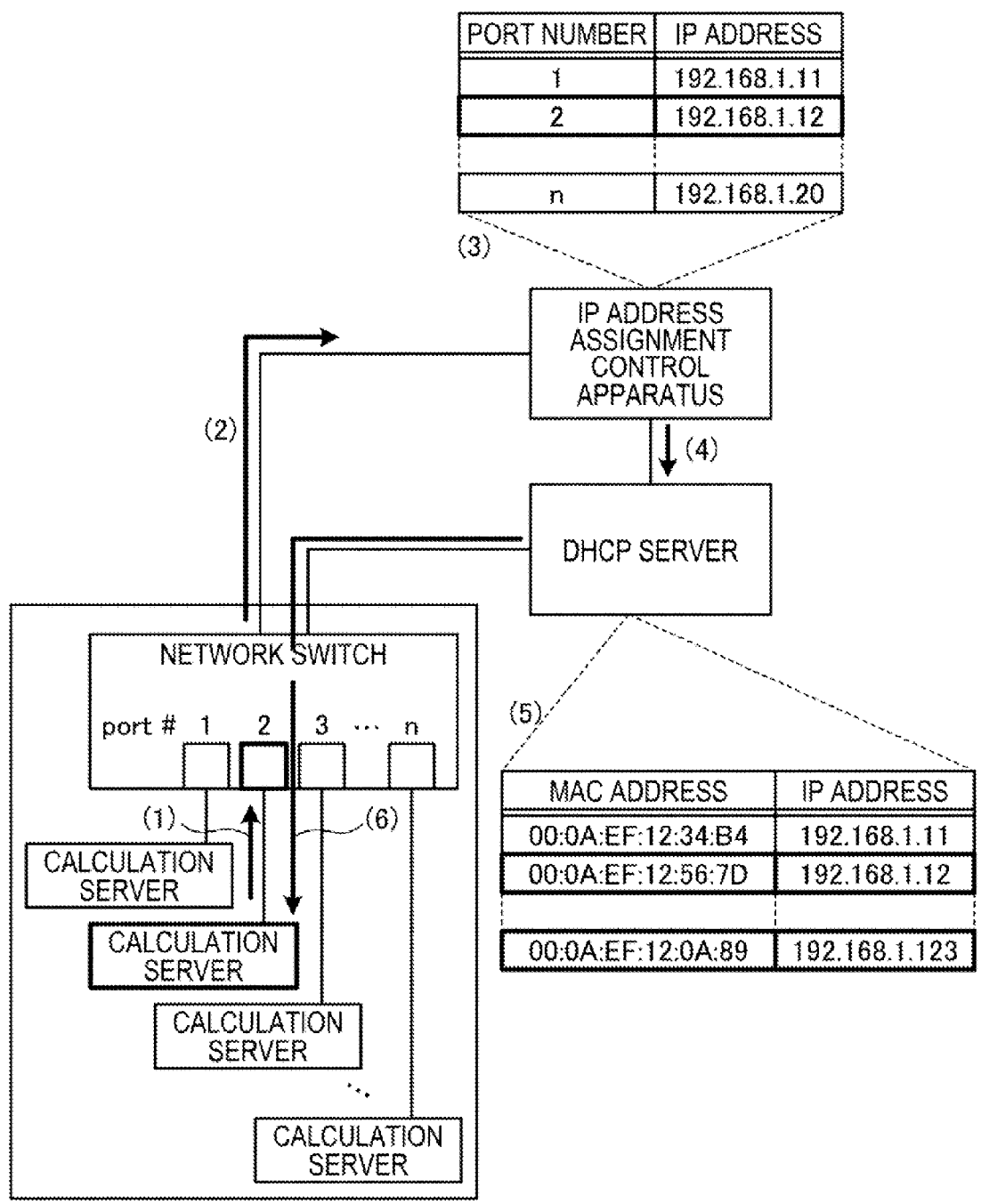
FIG. 15 is a diagram illustrating an example of IP address assignment control processing of the related art.

Although a case in which the various types of processing are achieved using hardware logic has been described in the above embodiments, the various types of processing may be realized by causing a computer to execute a prepared program. Accordingly, an example of a compute for executing an IP address assignment control program having functions that are analogous to those of the IP address assignment control apparatus 100 according to the above-described embodiment will be described below with reference to FIG. 11. FIG. 11 is a diagram illustrating a computer for executing an IP address assignment control program.

As illustrated in FIG. 11, a computer 11 that serves as the IP address assignment control apparatus 100 includes a HDD (hard disk drive) 13, a CPU 14, a ROM (read only memory) 15, and a RAM (random access memory) 16, which are connected through a bus 18.

The ROM 15 pre-stores an IP address assignment control program that achieves functions that are analogous to those of the IP address assignment control apparatus 100 in the second embodiment described above, i.e., pre-stores an obtaining program 15a, a storing program 15b, and an instructing program 15c, as illustrated in FIG. 11. The programs 15a to 15c may be integrated together or distributed, as required, as in the elements of the IP address assignment control apparatus 100 illustrated in FIG. 8.

The CPU 14 reads the programs 15a, 15b, and 15c from the ROM 15 to thereby cause the programs 15a, 15b, and 15c to serve as an obtaining process 14a, a storing process 14b, and an instructing process 14c, respectively, as illustrated in FIG. 11. The processes 14a, 14b, and 14c correspond to the obtaining section 121, the storing section 122, and the instructing section 123, respectively, illustrated in FIG. 8.

The CPU 14 executes the IP address assignment control program on the basis of IP address assignment data 16a recorded in the RAM 16.

The programs 15a to 15c do not necessarily have to be initially stored in the ROM 15. The programs 15a to 15c may be first stored on, for example, a portable physical medium loaded into the computer 11, a fixed physical medium provided inside or outside the computer 11, or another computer (or server) connected to the computer 11 through a public line, the Internet, a LAN (local area network), a WAN (wide area network), or the like and then be read therefrom by the computer 11 for execution. Examples of the portable physical medium include a flexible disk (FD), a CD-ROM, a DVD disk, a magneto-optical disk, and an IC card. One example of the fixed physical medium is a HDD.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A non-transitory computer-readable recording medium encoded with a computer program that includes instructions executable on a computer that serves as an internet-protocol (IP) address assignment control apparatus networked with first and second communication devices and a management server networked with the first and second communication devices, each communication device being connected to a server apparatus that sends an information request packet to the management server and that has first and second interfaces, the program causing the computer to execute a procedure, the procedure comprising;

obtaining, via a port of an interface provided in the first communication device, a first Media Access Control (MAC) address for the first interface provided in the server apparatus connected to the interface provided in the first communication device and a second MAC address for the second interface provided in the server apparatus connected to an interface provided in the second communication device; and storing, in a storage, the second MAC address for the second interface provided in the server apparatus based on an identification number for the port of the interface provided in the first communication device and the first MAC address for the first interface provided in the server apparatus, wherein an interface identification number for identifying the interface provided in the first communication device, a first IP address for the first interface provided in the server apparatus, and the first MAC address for the first interface provided in the server apparatus are associated with each other and are stored in the storage in conjunction with a second IP address for the second interface provided in the server apparatus.

2. The non-transitory computer-readable recording medium according to claim 1, the procedure further comprising:
obtaining, from the storage, the first MAC address and the first IP address associated with the first MAC address;
reporting the obtained first MAC address and the first IP address to the management server; and
instructing the management server so as to register the first MAC address and the first IP address.

3. The non-transitory computer-readable recording medium according to claim 2, further comprising:
instructing the management server to report to the server apparatus the first IP address associated with the first MAC address that was included in the information request packet.

4. An internet-protocol (IP) address assignment control apparatus networked with a first communication device, a second communication device, and a management server networked with the first and second communication devices, each communication device being connected to a server apparatus that sends an information request packet to the management server and that has first and second interfaces, the internet-protocol address assignment control apparatus comprising:
a storage in which an interface identification number for identifying an interface provided in the first communication device, a first IP address for the first interface provided in the server apparatus connected to the interface provided in the first communication device, and a first Media Access Control (MAC) address for the first interface provided in the server apparatus,
wherein the interface identification number, the first IP address, and the first MAC address are associated with each other and are stored in conjunction with a second IP address for the second interface provided in the server apparatus connected to an interface provided in the second communication device;
an obtaining section that obtains, via a port of the interface provided in the first communication device, the first MAC address for the first interface provided in the server apparatus and a second MAC address for the second interface provided in the server apparatus connected to the interface provided in the second communication device; and
a storing section that stores, in the storage, the obtained second MAC address for the second interface provided in the server apparatus, based on an identification number for the port of the interface provided in the first communication device and the first MAC address for the first interface provided in the server apparatus.

5. The internet-protocol address assignment control apparatus according to claim 4, further comprising:
an instructing section that obtains, from the storage, the first MAC address stored therein and the first IP address associated with the first MAC address, reports the obtained first MAC address and the first IP address to the management server, and instructs the management server so as to register the first MAC address and the first IP address.

6. The internet-protocol address assignment control apparatus according to claim 5, wherein the instructing section causes the first IP address associated with the first MAC address as included in the information request packet to be reported to the server apparatus.

7. An internet-protocol (IP) address assignment control method comprising:
obtaining, via a port of an interface provided in a first communication device, a first Media Access Control (MAC) address for a first interface provided in a server apparatus connected to the interface provided in the first communication device and a second MAC address for a second interface provided in the server apparatus connected to an interface provided in a second communication device; and
storing, in a storage, the obtained second MAC address for the second interface provided in the server apparatus based on an identification number for the pot of the interface provided in the first communication device and the first MAC address for the first interface provided in the server apparatus.

8. The IP address assignment control method according to claim 7, wherein an interface identification number for identifying the interface provided in the first communication device, a first IP address for the first interface provided in the server apparatus, and the first MAC address for the first interface are associated with each other and are stored in the storage in conjunction with a second IP address for the second interface provided in the server apparatus.

9. The IP address assignment control method according to claim 8, further comprising:
obtaining, from the storage, the first MAC address stored from storing and the first IP address associated with the first MAC address;
reporting the obtained first MAC address and the first IP address to the management server; and
instructing the management server so as to register the first MAC address and the first IP address.

10. The internet-protocol address assignment control method according to claim 9, further comprising:
instructing the management server to report to the server apparatus the first IP address associated with the first MAC address that was included in an information request packet sent by the server apparatus and obtained in the obtaining via the interface provided in the first communication device.

* * * * *